United States Patent
Willner et al.

(10) Patent No.: US 7,068,017 B2
(45) Date of Patent: Jun. 27, 2006

(54) OPTIMIZATION ARRANGEMENT FOR DIRECT ELECTRICAL ENERGY CONVERTERS

(75) Inventors: Christopher A Willner, Rochester, MI (US); Michael Cummins, Oxford, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 200 days.

(21) Appl. No.: 10/655,787

(22) Filed: Sep. 5, 2003

(65) Prior Publication Data

US 2005/0052165 A1 Mar. 10, 2005

(51) Int. Cl.
*G05F 1/618* (2006.01)

(52) U.S. Cl. .......................... 323/272; 323/266; 307/64
(58) Field of Classification Search ................. 323/229, 323/906, 222, 282, 273, 274, 272, 266; 363/71, 363/78, 79, 123, 125; 307/43, 64, 66
See application file for complete search history.

(56) References Cited

U.S. PATENT DOCUMENTS

| | | | | | |
|---|---|---|---|---|---|
| 3,523,239 | A | * | 8/1970 | Heard | 323/222 |
| 4,468,569 | A | * | 8/1984 | Norris | 290/1 R |
| 4,850,090 | A | * | 7/1989 | Catlow | 323/303 |
| 4,873,480 | A | * | 10/1989 | Lafferty | 323/299 |
| 5,659,465 | A | * | 8/1997 | Flack et al. | 363/71 |
| 5,856,741 | A | | 1/1999 | Hasegawa | |
| 6,081,104 | A | * | 6/2000 | Kern | 323/268 |

* cited by examiner

*Primary Examiner*—Rajnikant B. Patel
(74) *Attorney, Agent, or Firm*—Ralph E Smith

(57) ABSTRACT

An arrangement is provided for supplying electrical energy to a load from a direct electrical energy converter that optimizes converter power generation efficiency. The arrangement for optimizing converter power generation efficiency includes an impedance transformation circuit coupled between the energy converter and load for regulating current delivered by the energy converter so as to maximize power delivered to the load.

12 Claims, 6 Drawing Sheets

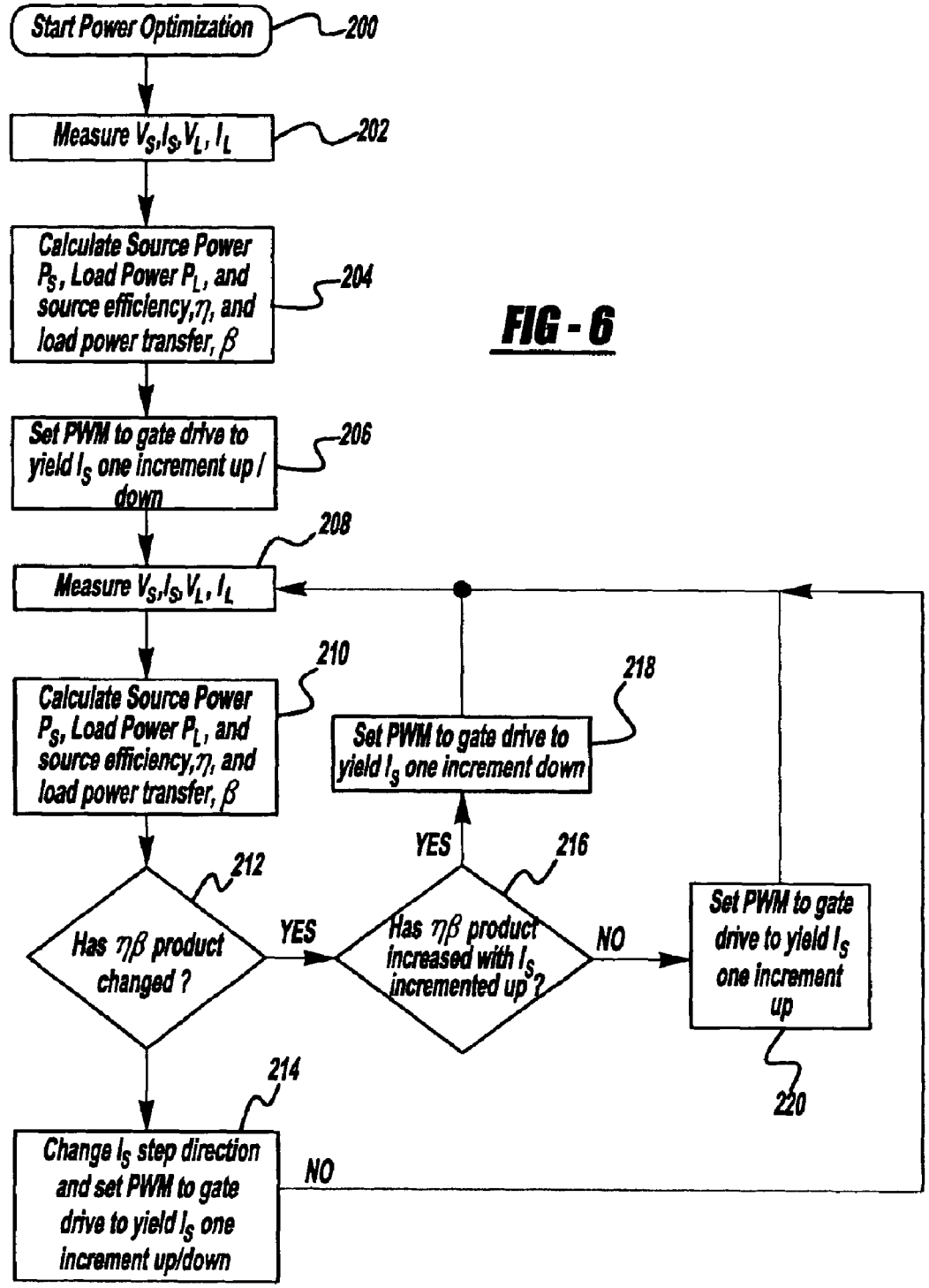

OPTIMIZATION ARRANGEMENT FOR DIRECT ELECTRICAL ENERGY CONVERTERS

FIELD OF THE INVENTION

The present invention relates to vehicular power systems, and more particularly to an optimization arrangement for both primary and direct energy converters.

BACKGROUND OF THE INVENTION

In most DC electrical power systems for automotive, aerospace and stationary applications, the electrical power requirements have been increasing dramatically over the last several years. There is an ongoing trend to move to a 42-volt power system which is now being deployed in the automobile industry in order to meet the increased electrical parasitic loads. The increasing use of electrical systems in automobiles and aircraft is driven by the introduction of new functionality which will be provided by these systems, and an inherently higher level of control when engine-driven loads are replaced with electrically-powered versions.

One arrangement for addressing this rise in electrical power requirements uses direct energy converters (DECs) to recover heat and waste energy and augment the current power plants in vehicles. DECs provide electrical power over an extremely broad range of voltages, nominally 1 mV to several volts DC, but are typically stacked up in series to provide voltages in excess of 300 volts DC. The load currents typically range from 1 milliamp to 300 amps DC, as the power demand in DC electrical systems can vary widely depending upon the mode of operation and upon parasitic subsystems which randomly come on line.

If as stated above, DECs are utilized to augment the engine or power-plant, and as such, improve their overall efficiency, it is further desirable that the energy converter itself be optimized to operate at high efficiencies. The proposed system is introduced in order to provide a control scheme (hardware and software) necessary to achieve these higher efficiencies. In addition, the proposed system could also be used to optimize or maximize the lifetime and stability of the DEC energy source.

SUMMARY OF THE INVENTION

In accordance with one aspect of the invention, a system supplies electrical energy to a load from a direct electrical energy converter using an arrangement for optimizing converter power generation efficiency. The arrangement for optimizing converter power generation efficiency includes an impedance transformation circuit coupled between the energy converter and load for regulating current delivered by the energy converter so as to maximize power delivered to the load.

In accordance with another aspect of the invention, a method is provided for optimizing power generation efficiency of a direct electrical energy converter applying electrical current to a load. The optimization method includes monitoring output current and output voltage of the direct electrical energy converter and monitoring current through and voltage across the load. Next, an impedance transformation circuit is placed between the direct electrical energy converter and the load. Then, the optimization method involves adjusting the impedance of the impedance transformation circuit as a function of monitored energy converter current and voltage and load current and voltage so as to maximize power delivered to the load.

BRIEF DESCRIPTION OF THE DRAWINGS

The present invention will become more fully understood from the detailed description and the accompanying drawings, wherein:

FIG. 6 is a flowchart of a method implemented by the controller of FIG. 4 for maximizing the efficiency-power product of the optimization system of FIG. 4.

DETAILED DESCRIPTION OF THE PREFERRED EMBODIMENTS

Figure 1:
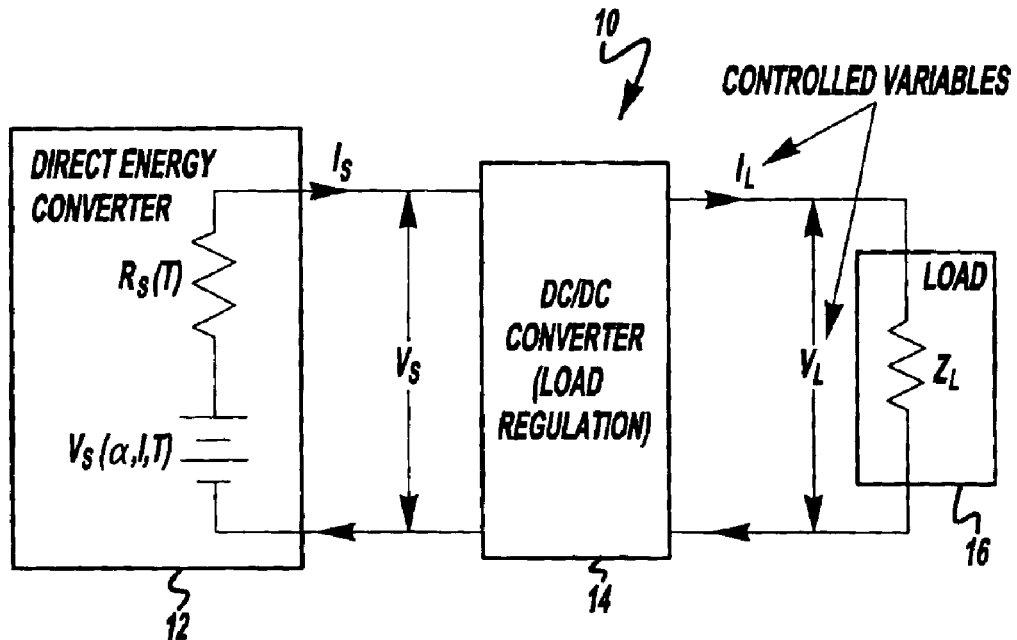
FIG. 1 is a prior art circuit diagram of a typical system involving a direct energy converter where a DC/DC converter is used to regulate the energy to the load.

Referring to FIG. 1, a conventional arrangement 10 is shown. The conventional arrangement 10 has a DEC 12 which creates a current $I_S$ and a voltage $V_S$. The DEC 12 is coupled to a DC/DC converter 14. DC/DC converter 14 is coupled to a load 16. Current $I_S$ flows from the DEC 12, through the DC/DC converter 14 to the load 16 and back to the DEC 12. The DC/DC converter 14 is used in situations where the energy to the load voltage $V_S$ of the DEC 12 is different from the voltage required by the load 16. The DC/DC converter 14 typically has an efficiency in the range of 90–99%, for power levels less than 1 kilowatt and 85–95% for power levels between 1 to 50 kilowatts. The idea behind the conventional optimization arrangement 10 is to apply a constant terminal voltage across or constant current through the load 16. However, this solution only addresses regulation of the load 16 and does not consider the internal efficiency or operating current of the DEC 12. Furthermore, the arrangement 10 does not necessarily optimize the power being drawn from the DEC 12 or delivered to the load 16 through impedance matching of the DEC internal resistance and the load resistance (real part of the load impedance).

Figure 2:
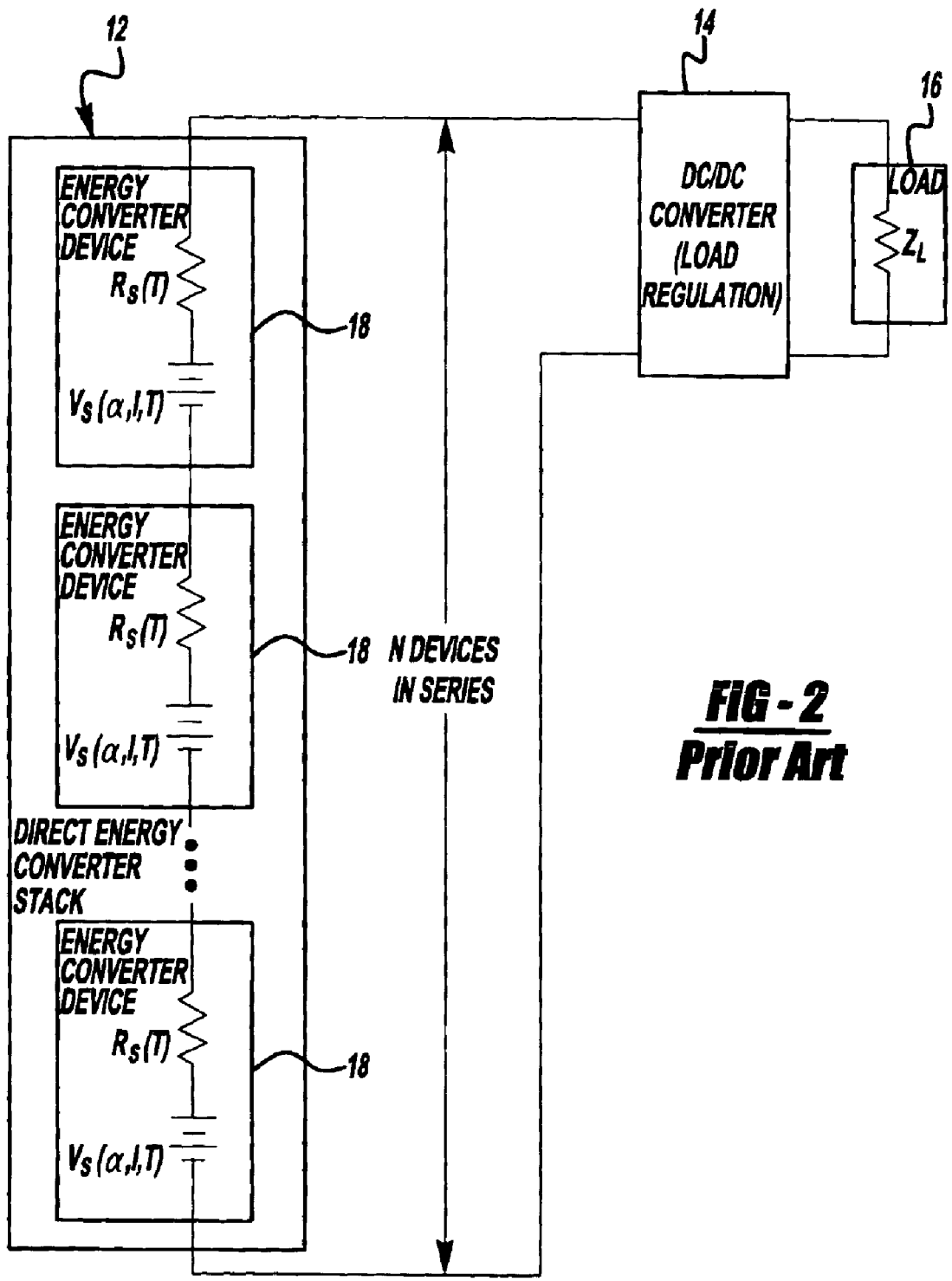
FIG. 2 is a circuit diagram of a prior art series stacked generator for use with the source optimization system.

As shown in FIG. 2, most DECs 12 are comprised of a number of individual DEC circuits 18 in order to generate the appropriate system power and voltage requirements (up to several hundred individual DEC circuits 18 in some cases). These individual DECs circuits 18 are usually configured in "stacks" of either series or parallel circuit configurations to achieve different voltage conditions depending upon the specific technology. The DC/DC converter 14 shown in FIG. 2 does not optimize the DEC 12 according to which stacked configuration of the DEC 12 works best for a given situation; series, parallel or some hybrid of the two.

Figure 3:
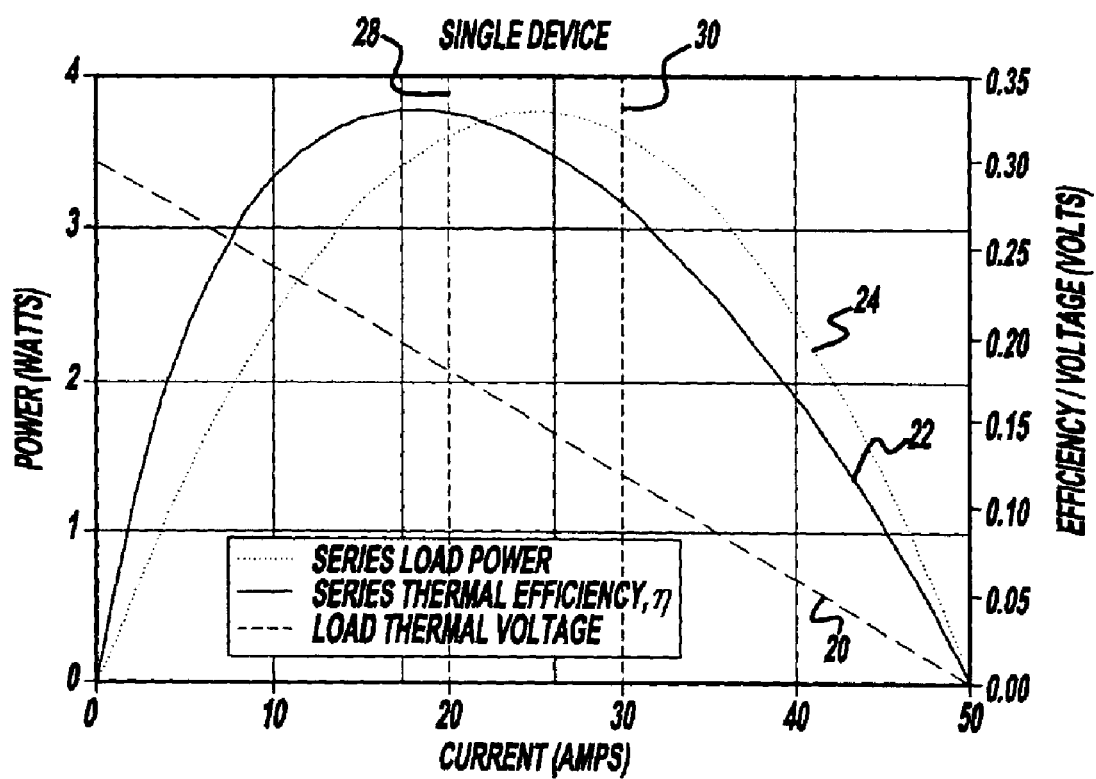
FIG. 3 is a graph of the power, voltage and efficiency of a typical thermoelectric generator employed as a direct energy converter for a single thermoelectric device where conventional means are used to regulate the energy to the load.

FIG. 3 shows the problems with the conventional optimization system 10. The voltage-current characteristic 20 of a typical thermoelectric generator (TEG) are displayed. For this curve, the thermoelectric devices are connected directly to a load and hence the load current is equal to the source current. The thermal efficiency 22 and the power delivered to the load 24 as a function of current are also plotted. The load power 24 is calculated from the power ($I^2R_L$) developed in the load resistance, ($R_L$). The thermal efficiency is defined by the power ($I^2R_S(T)$) lost in the source internal resistance, ($R_S(T)$), the Seebeck power ($k\Delta T$) produced by a thermal gradient applied across the device, and the Peltier effect ($\alpha TI_S$). It can be seen that the current 28 at which maximum TEG efficiency is achieved is not equal to the current 30 at which maximum power is delivered to the load 32.

Figure 3A:
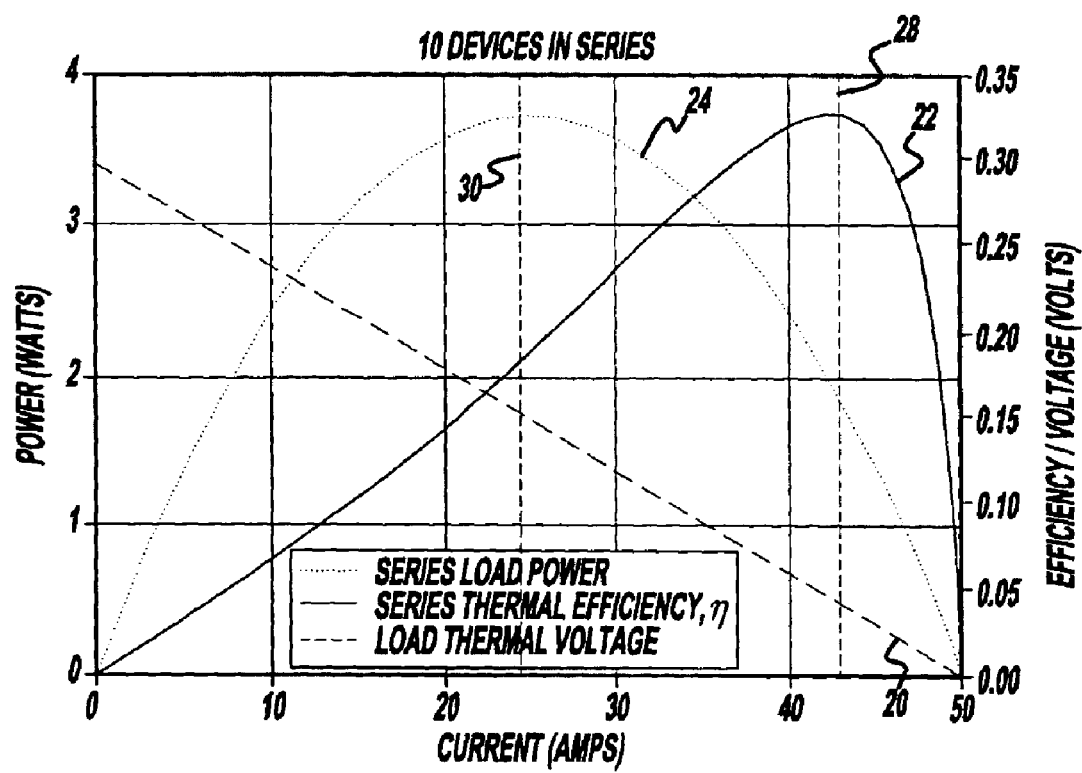
FIG. 3a is a graph of the power, voltage and efficiency for ten thermoelectric devices in series, where conventional means are used to regulate the energy to the load.

Furthermore, when ten thermoelectric devices are connected in series, as shown in FIG. 3a, the discrepancy becomes even more pronounced. This is shown by the difference between the current 28 at which maximum TEG efficiency is achieved and the current 30 at which maximum power is delivered to the load 32 when compared to FIG. 3.

Figure 4:
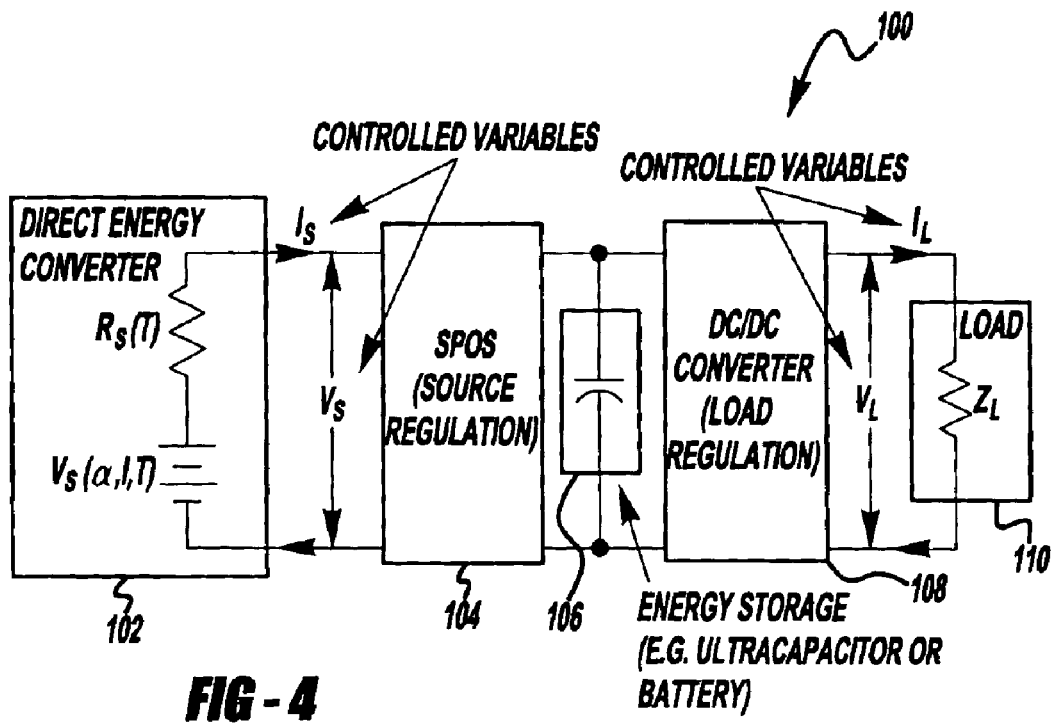
FIG. 4 is a circuit diagram of the optimization system according to the principles of the present invention.

With reference now to FIG. 4, an optimization system 100 for an electrical power conversion system is shown. The optimization system 100 includes a DEC 102. The DEC 102 is coupled to a source power optimization system (SPOS) 104. The SPOS 104 is further coupled in parallel to an energy storage device 106. The energy storage 106 device is also coupled in parallel to a load regulator 108, in this example a DC/DC converter. The load regulator 108 is connected in parallel to a load 110.

The DEC 102 is a generator which may be any voltage or current source such as a thermoelectric or thermoionic device, electrochemical battery, solar cell or photovoltaic converter, thermophotovoltaic system, fuel cell, plasma power generator, ferroelectric device, piezoelectric device, electrohydrodynamic generator and the like, which produces a voltage, ($V_S$), and results in a source current ($I_S$). The DEC 102 could also function as a current generator, ($I_S$), with a subsequent compliance voltage, ($V_S$), such as is the case with a photovoltaic device. The current $I_S$ flows from the DEC 102 to the SPOS 104.

Figure 5:
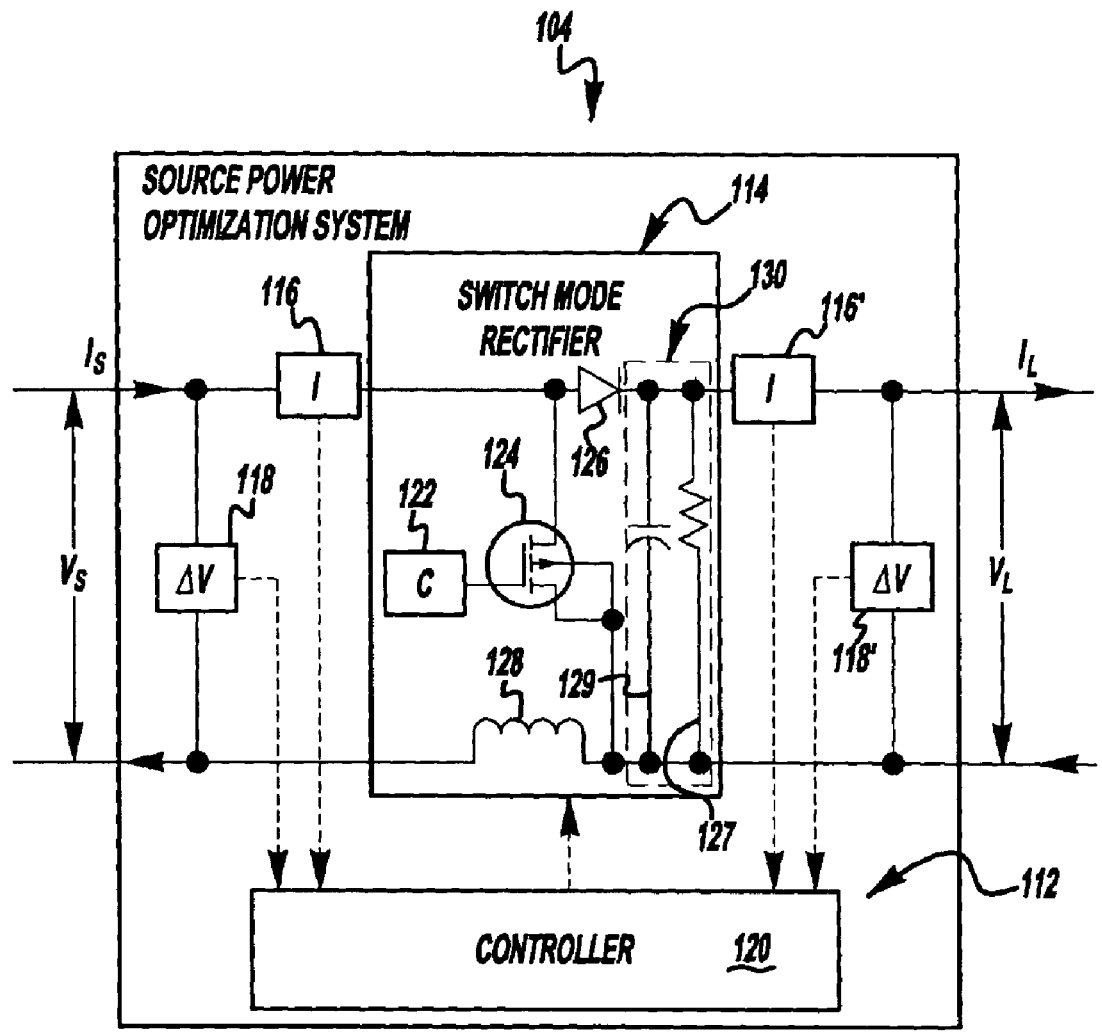
FIG. 5 is a detailed circuit diagram of the source power optimization system as shown in FIG. 4.

In an exemplary embodiment, the SPOS 104 includes a control circuit 112 and a switch mode rectifier circuit 114 as best shown in FIG. 5. The control circuit 112 includes a current sensor 116 coupled to the DEC 102 and a voltage sensor 118 also coupled to the DEC 102. A second set of voltage and current sensors 116', 118' measure values from the load 106. The current sensors 116, 116' could be an ammeter or a multi-meter. The voltage sensors 118, 118' may be a voltmeter or a multi-meter. Alternatively, a pair of multi-meters could be used to measure both the voltage and the current from the DEC 102 and the voltage and the current from the switch mode rectifier circuit 114. The current sensors 116, 116' and the voltage sensors 118, 118' are coupled to a controller 120. The controller 120 uses the current and voltage measurements from the sensors 116, 116', 118, 118' to drive the switch mode rectifier circuit 114.

The switch mode rectifier circuit 114 includes a gate drive circuit 122 which is coupled to the controller 120. The gate drive circuit 122 generates the pulses for a power semiconductor switch 124 within the switch mode rectifier circuit 114. The DEC 102 supplies the current $I_S$ to the power semiconductor switch 124 which may comprise power metal-oxide semiconductor field effect transistor (MOSFET). It is to be understood that other types of switching devices 124 can be used within the scope of the invention, such as an insulated gate bipolar transistor (IGBT), bipolar transistor or power field effect transistor.

The power semiconductor switch 124 is coupled to a power diode 126 and an inductor 128. The inductor 128 is used to store excess energy during the on cycle of the power semiconductor switch 124. In the example of FIG. 5, an inductance of approximately 10 milli-Henries was used, but the inductance can vary depending upon system requirements. The power diode 126 is coupled in series to an output filter 130. The output filter 130 reduces ripple current and smoothes the DC output, ($V_{out}$). In the example of FIG. 5 the output filter 130 includes a resistor 127 with a resistance of approximately 20 ohms and a capacitor 128 with a capacitance of approximately 470 mirco-Farads. The output filter 130 is coupled in parallel to the energy storage device 106 of FIG. 4.

The storage device 106 is coupled to the SPOS 104 to provide some load balancing and to meet the load power demand by providing an energy reserve. In the example of FIG. 4, the storage device 106 shown is an ultra-capacitor, however any other mechanism for storing energy such an electrochemical battery could be employed. The storage device 106 is also coupled to a DC/DC converter 108 for providing load regulation.

The load regulator 108 regulates the current flowing to the load 110. Further load leveling can also be achieved by incorporating the appropriate battery or capacitance across the load 110 if necessary.

The load 110 presents a complex impedance to the SPOS 104 (which can be written as $Z_L = R_L + X_L$, where, $R_L$ is the resistive or real part, and $X_L$ is the inductive/capacitive part). The load 110 could also be one of a fixed resistance, capacitance or inductance, $Z_L$. The second current and voltage sensors 116', 118' measure the current to the load $I_L$ and the voltage across the load $V_L$. The second sensors 116', 118' transmit the current and voltage measurements to the controller 120.

The optimization system 100 functions by using the switch mode rectifier circuit 114 to perform an impedance transformation based on input from the controller 120. In general terms, the controller 120 sends a pulse-width modulated (PWM) signal based on an optimized value of the source current Is from the DEC 102 to the gate drive circuit 122. The gate drive circuit 122 sends a signal to the power semiconductor switch 124, which then switches on and off at a rate determined by the controller 120. High efficiency power transfer is achieved by modulating the power semiconductor switch 124, which is turned on and off at frequencies in the 10 kiloHertz range. The PWM signal created by the controller 120 has a duty cycle, d which is calculated based upon the voltage and current measured by the sensors 116, 116', 118, 118'. This results in the power diode 126 going into conduction and non-conduction in a complementary manner.

Assuming that the current $I_S$ is relatively constant over a PWM cycle, then the local average value of the voltage, $\langle V_1 \rangle$, is given by, $\langle V_1 \rangle = (1-d) \cdot V_{LOAD}$ and the local average of the output current, $\langle I_L \rangle$, is given by, $\langle I_{LOAD} \rangle = (1-d) \cdot I_S$. By controlling the duty cycle ratio, d, one can vary the local average voltage, $\langle V_1 \rangle$, to any value below $V_L$. Thus, the switch mode rectifier circuit 114 optimizes the current $I_S$ from the DEC 102.

An exemplary routine for the controller 120 is shown in FIG. 6. The controller 120 begins the optimization in step 200. Next, in step 202, the controller 120 measures the voltage and the current of the DEC 102 and the load 110 from the sensors 116, 118, 116', 118'. In step 204, the controller 120 calculates the source power $P_S$, the load power $P_L$, the source efficiency η and the load power transfer β. For a typical thermal electric generator, the source efficiency η is given by $$\eta_T = \frac{I_S^2 R_{Load}}{K\Delta T + \alpha T_H I_S + \frac{1}{2} I_S^2 R_{Internal}}$$

where K is the thermal conductivity, ΔT is the thermal gradient across the device and $T_H$ is the hot side temperature. The load power transfer β is defined as $$\beta = \frac{R_L}{R_I},$$

where $R_I$ is the combined impedance of DEC 102, regulator 108, SPOS 104 and DEC 102 as seen from the load 110.

Next, at step 206 the controller 120 sets the PWM to yield a source current $I_S$ one preselected increment up or down in step 206. In step 208, the controller 120 re-measures the voltage and the current of the DEC 102 and the load 110 from the sensors 116, 118, 116', 118'. The controller 120, in step 210, recalculates the source power $P_S$, the load power $P_L$, the source efficiency η and the load power transfer β. In step 212, the controller 120 determines if the product of the source efficiency η and the load power transfer β has changed. If the product of the source efficiency η and the load power transfer β has not changed, then the controller 120 goes to step 214. In step 214, the controller 120 reverses the step direction of the source current $I_S$ (up to down, or down to up) and sets the PWM to the gate drive circuit 122 to yield a source current $I_S$ one increment up or down from the previous value. The controller 120 then loops to step 208.

If the ηβ product has changed, then the controller 120 goes to step 216. In step 216, if the product has increased and $I_S$ was incremented up, then the controller 120 goes to decision block 218. In step 218, the controller 120 sets the PWM to gate drive to yield $I_S$ one increment down from its previous value. Then the controller 120 loops to step 208.

If at block 216 the product did not increase with $I_S$ incremented up, then the controller 120 moves to step 220. In step 220, the controller 120 sets the PWM to gate drive to yield $I_S$ one increment up from its previous value. The controller 120 then loops to step 208, and the polarity of the incrementation remains unchanged.

The optimization system 100 increases the efficiency of the DEC 102 by about 50% for typical loads under continuous operation. The optimization configuration 100 for the DEC 102 also enables both source and load regulation, resulting in optimum power delivered to the load 110. Furthermore, the design of the switch mode rectifier circuit 114 is versatile enough to achieve superior performance especially for high power and hybrid vehicle applications, however, other designs are possible such as a conventional buck-boost or Cuk non-isolated DC/DC converter.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. In a system for supplying electrical energy to a load from a direct electrical energy converter, an arrangement for optimizing converter power generation efficiency comprising:

an impedance transformation circuit coupled between the energy converter and load including a power switch operative in a first state to conduct current from the energy converter to the load and operative in a second state to inhibit energy converter current from reaching the load;

an energy converter output current sensor coupled to the energy converter;

an energy converter output voltage sensor coupled to the energy converter;

a load current sensor coupled to the load;

a load voltage sensor coupled to the load; and a controller coupled to each of the sensors and the power switch, the controller operative to place the power switch in its first and second state in accordance with a desired duty cycle based on a signal from each of the sensors so as to maximize power delivered to the load, and wherein a polarity of the energy converter current delivered to the load is dependent on a product of energy efficiency of the energy converter and power transfer efficiency from the energy converter.

2. The arrangement of claim 1 further comprising:

a load voltage regulator coupled between an output of the impedance transformation circuit and the load.

3. The arrangement of claim 2 wherein the load voltage regulator comprises a DC/DC converter.

4. The arrangement of claim 2 further comprising:

a load balancing energy storage device coupled across the output of the impedance transformation circuit and an input of the load voltage regulator.

5. The arrangement of claim 4 wherein the load balancing energy storage device comprises a battery.

6. The arrangement of claim 4 wherein the load balancing energy storage device comprises an ultra-capacitor.

7. The arrangement of claim 1 wherein the energy converter is selected from the group consisting of: fuel cell, thermoelectric or thermoionic device, electrochemical battery, solar cell or photovoltaic converter, thermophotovoltaic system, plasma power generator, ferroelectric device, piezoelectric device, electrohydrodynamic generator.

8. A method of optimizing power generation efficiency of a direct electrical energy converter applying electrical current to a load, the method comprising:

monitoring output current and output voltage of the direct electrical energy converter;

monitoring current through and voltage across the load;

placing an impedance transformation circuit between the direct electrical energy converter and the load; and altering a duty cycle of the impedance transformation circuit so as to allow the impedance transformation circuit to operate in a first state to deliver the energy converter current to the load and operating in a second state to inhibit energy converter current from reaching the load so as to maximize power delivered to the load, and wherein a polarity of the energy converter current delivered to the load is dependent on a product of energy efficiency of the energy converter and power transfer efficiency from the energy converter.

9. The method of claim 8 wherein the polarity of the predetermined amount is reversed whenever the product has not changed.

10. The method of claim 8 wherein the polarity of the predetermined amount is reversed whenever the product changes positively and a present polarity of the predetermined amount is positive.

11. The method of claim 8 wherein the polarity of the predetermined amount is reversed whenever the product changes negatively and a present polarity of the predetermined amount is negative.

12. The method of claim 8 wherein the polarity of the predetermined amount is unchanged whenever the product changes in a direction opposite to the present polarity of the predetermined amount.

* * * * *